United States Patent [19]
Horn

[11] 3,799,080
[45] Mar. 26, 1974

[54] DISTRIBUTOR
[76] Inventor: Wayne L. Horn, 2602 Flemons St., Stockton, Calif. 95206
[22] Filed: Aug. 28, 1972
[21] Appl. No.: 284,445

[52] U.S. Cl. .................................. 111/7, 251/206
[51] Int. Cl. ........................................ A01c 23/02
[58] Field of Search .................... 111/7, 6; 251/206; 239/562; 137/561, 625

[56] References Cited
UNITED STATES PATENTS
| | | | |
|---|---|---|---|
| 2,650,556 | 9/1953 | Turner | 111/7 |
| 3,218,999 | 11/1965 | Pattison | 111/7 |
| 2,780,833 | 2/1957 | Braunlich | 251/206 X |

Primary Examiner—Stephen C. Pellegrino
Attorney, Agent, or Firm—Robert E. Strauss

[57] ABSTRACT

A flow distributing device is described which is useful for effecting even distribution of a liquid from a central source to a plurality of conduits at variable flow rates. The device comprises a distributor housing with a plate bearing connecting means to a plurality of conduits. The connecting means are distributed on the plate on a predetermined pattern while a second plate is positioned in the assembly between the housing and the plate bearing the connecting means. This latter plate is movable between a plurality of positions and bears a series of apertures for each of the multiple connections, which apertures have varied cross-sectional area. The apertures are similarly disposed on the movable plate in a predetermined pattern so that at any position of the movable plate in the assembly, all of the multiple connections will be in communication with the housing through apertures of equal cross-sectional dimensions.

The distributor is particularly useful in combination with a liquid fertilizer distributor. These distributors comprise a storage tank in which the liquid fertilizer is contained, pump means which removes liquid from the storage tank and forces the liquid under pressure to the flow distributor and a plurality of tubing lines connected to the multiple connecting means of the flow distributor, each of the tubing means passing to liquid discharge means. The flow rate or fertilizer application rate for this device is controlled by the displacement or revolution speed of the pump and the settings on the pumping rate are correlated with the settings of the movable flange to provide flow distributing orifices of small cross-sectional area with the low pump rates and proportionally larger apertures with greater rates.

7 Claims, 3 Drawing Figures

DISTRIBUTOR

DESCRIPTION OF THE INVENTION

This invention relates to means for distribution of flow equally into a plurality of conduits and, in particular, relates to a device which can be used in a liquid fertilizer applicator to effect even distribution of fertilizers to a plurality of fertilizer application points.

A very high proportion of fertilizers and pesticides applied in this country is applied as a liquid using various means for evenly distributing the liquid on the treated area. Fertilizer applicators which have been used have a distributing boom along which a plurality of discharge tubes are evenly spaced. The tubes are supported by curved shanks which are adapted to be dragged into the ground at a depth of from 3 to about 20 inches so that the fertilizer is injected directly into the ground. Other distributing devices can also be used, e.g., some distributors can be associated with plows and the liquid discharge conduits can be placed to discharge in front of the leading edge of the plow. Other techniques employ coulter discs or other means for tilling the soil.

The devices are drawn through the field, usually by attachment to a tractor; some of the devices are adapted for mounting on the rear of a tractor while others are self-supporting and are hitched to the tool bar of the tractor. All of the applicator devices have a storage tank which can be supported by the tractor. A pump is provided on some of the devices; this pump is adapted to withdraw a liquid from the storage tank and force it to the applicator injectors at a controlled rate. Other devices employ a gravity feed. The pumps, which are used for transferring the liquid, are capable of controlled and various application rates either by changing the displacement of the pump through means to vary its stroke or means to vary the speed of revolution of the pump.

A problem occurs, however, in obtaining even distribution of the flow through the device to each of the applicator injectors. The flow rate should be variable through an approximately tenfold range with, typically, about 3 to 5 settings. This large variation in discharge rate will unavoidably result in uneven distribution through the conduits which go to the individual applicator injectors since these conduits present flow paths of varied frictional resistance.

One of the most common solutions to achieving even distribution of flow to the individual applicator injectors has been the use of a distributing device having spring biased needle valves that are maintained in adjustment to provide a substantially equal flow resistance in each of the individual conduits. This device, however, requires a large amount of maintenance and, furthermore, is not readily applicable to handling of suspensions or slurries of solids in liquids. A need, therefore, exists for a simple, foolproof and low maintenance flow distributor.

I have now found that a flow distributor of a relatively simple construction can be devised which will achieve uniform flow distribution over a wide range of flow rates. This device comprises a housing which is adapted to receive a supply of pressured liquid from the system, with at least one wall of the housing in the form of a plate which carries a plurality of connecting means for attachment to individual conduits leading to the applicator injectors and, associated therewith, a second plate which is movable between a plurality of positions, said associated plate bearing a plurality of sets of apertures, each set of apertures comprising an aperture of a different cross-sectional area for each of the varied positions of said associated plate. The manner of movement of the associated plate between its predetermined positions can be varied as well as the particular pattern of positioning of the apertures and the multiple connecting means in the flange of the housing. The entire assembly is held together by suitable retaining means with gasket means employed where necessary to maintain the housing in a sealed configuration.

The invention will now be described by reference to the FIGURES of which:

Figure 1:
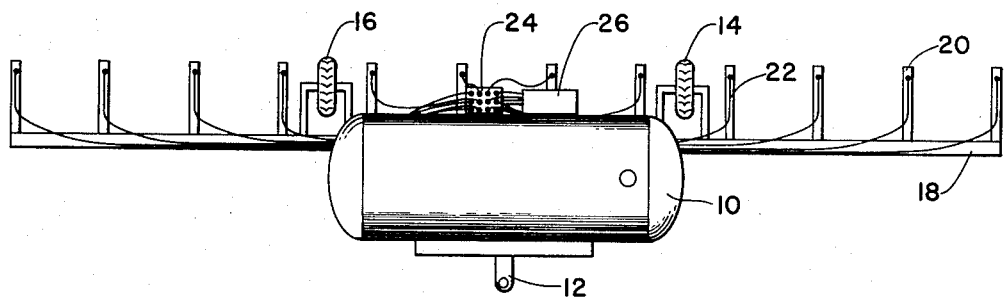
FIG. 1 is a plan view of a typical fertilizer and herbicide applicator rig.

Referring now to FIG. 1, there is illustrated a typical liquid applicator which is used for distribution of fertilizers for pesticides in fields. The applicator comprises a liquid storage tank 10 that is mounted on a frame, not shown, and the frame is adapted with a hitch such as 12 or other means for connection to the tool bar of a tractor. The applicator as illustrated is self-supported by wheels 14 and 16 which are mounted on the lower frame of the device. The frame also supports the applicator boom 18 which can extend from 10 to about 40 feet or more in sections which are adapted for folding when travelling to and from the field.

Disposed along the length of the boom 18 are a plurality of injector shanks 20. These injector shanks can be in varied forms but are generally resiliently mounted by leaf or coil springs on boom 18 in a manner which permits a limited degree of flexing of the shank in the event that an obstruction is encountered. The shank comprises a toothed element, not shown, which is adapted to be dragged beneath the surface of the ground at a depth from about 3 to about 20, commonly from about 3 to about 10 inches. The toothed element also carries a conduit and this conduit is in communication with the various tubing 22 that extends from the injector conduit to the flow distribution device of this invention shown at 24. Each of the injector shanks has a tooth element as described and an injector conduit with tubing 22 extending to this distributor device.

The distributor 24 receives a pressured supply of liquid from pump 26 which is adapted to supply the liquid thereto at rates sufficient to provide a distribution of from 15 to about 150 gallons per acre of the liquid as the device is moved through the field at speeds of from 2 to about 7 miles per hour. The pump can be driven by any suitable means, e.g., the power takeoff of the tractor or it can be driven by wheels 14 or 16 of the applicator itself. Alternatively, a separate power supply can be provided for driving of this pump. Regardless of the means of motivation of pump 26, this pump is adapted for providing a controllable varied rate of discharge. Typically, the rate of discharge is variable through a series of from 2 to about 6 settings, typically about 4 settings.

In a typical embodiment, the boom 18 has a length of 8 to 20 feet and is provided with 4 to 12 shank and nozzle assemblies. The pump supplies liquid at about 35 to 40 psig, the liquid being withdrawn from supply tank 10 which has a capacity of about 75 to 1,000 gallons. The pump 26 has multiple settings which are adapted to supply liquid at 15 to 150 gallons per acre as the device is moved through the field at a velocity of from 1 to about 7 miles per hour. The shanks are adapted to be embedded into the ground at a depth of about 3 to 10 inches.

Figure 2:
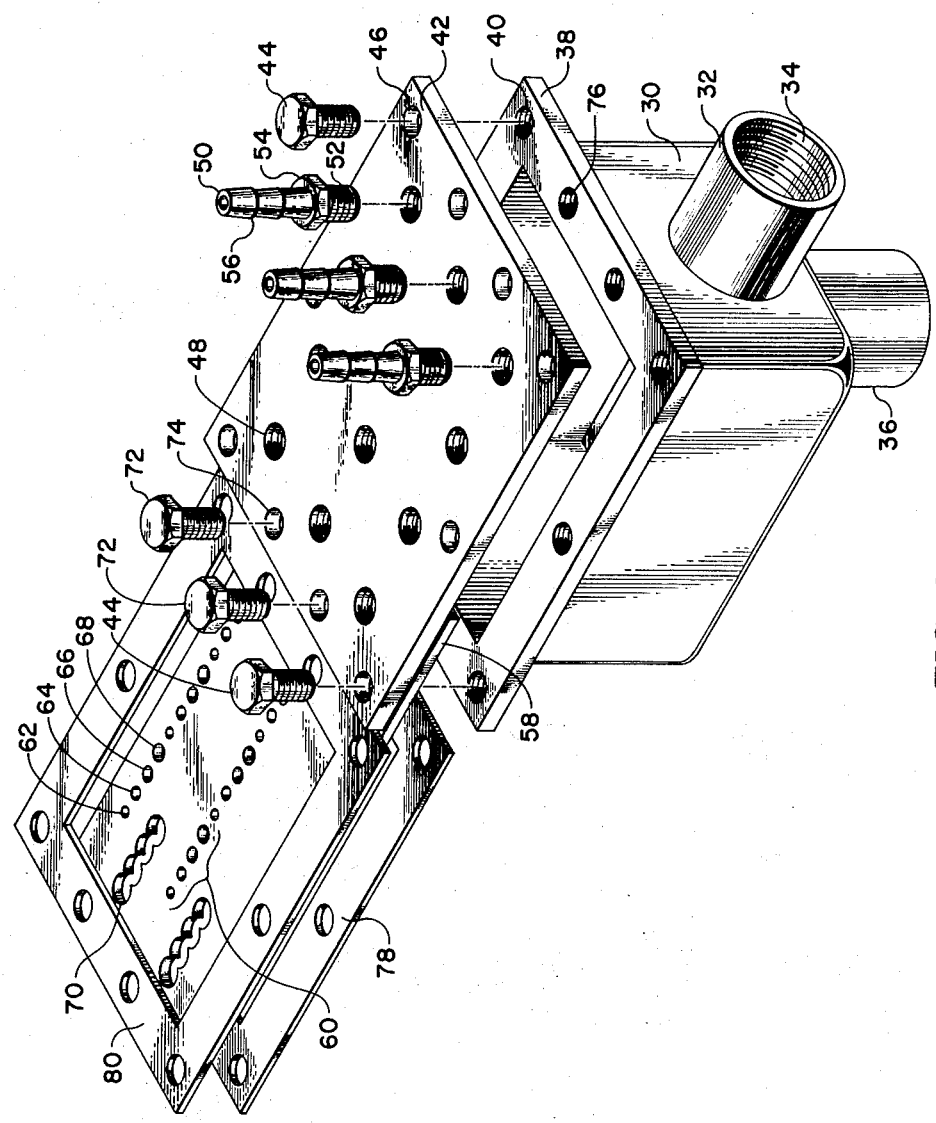
FIG. 2 is a view of the flow distributor according to this invention.

FIG. 2 illustrates the distributor of this invention which is used in the aforedescribed liquid applicator. The device comprises a housing 30 which can be of any suitable configuration; a rectangularly shaped housing being illustrated. The housing is provided with connecting and flow passageway means 32 which is provided with connecting means such as threads 34 for attachment of a conduit to permit discharging of pressure fluid into the housing 30. A second flow passageway means 36 can also be provided in the bottom of the housing as illustrated. During normal operation this conduit 36 is closed with a suitable plug that is turned into female threads of conduit 36. This plug can be used when desired for drainage of liquid from housing 30.

Housing 30 has a peripheral flange 38 that is provided with a plurality of tapped bores 40. Housing 30 is covered by distributor plate 42 which can be secured thereto by machine bolts 44 that extend through bores 46 in each of the corners of flange 42 and engage the tapped bores 40 of peripheral flange 38. Disposed on the plate 42 are a plurality of tapped bores 48 which are arranged in a predetermined, geometric pattern. The particular geometric pattern shown in the illustration comprises a series of parallel rows of bores 48. Bores 48 are tapped with female threads and a plurality of conduit connecting means, e.g., connectors 50, are provided, one in each of tapped bores 48. The particular connecting means illustrated comprises a plastic tubing adaptor having a male threaded end 52, a flange portion 54 with wrench flats and a stem 56 the outer surface of which is formed with angular undercuts to provide a scalloped profile, as shown, that permits the facile attachment of flexible tubing thereto but that resists the removal of tubing therefrom. These connecting means are conventional and are readily obtainable.

Associated with the aforedescribed cover plate 42 is a second plate means 58. Plate 58 is slightly longer than cover plate 42 and is adapted for a varied setting in the assembly along its major axis. The plate 58 has a plurality of apertures and these apertures are provided in sets such as 60. The apertures in each set have a predetermined cyclic pattern of a small aperture 62, a slightly larger diameter aperture 64, a larger aperture 66 and a largest aperture 68. This cycle repeats with each set of apertures and the sets of apertures are disposed in the same geometrical pattern as are bores 48 of cover plate 42.

Means are provided for permitting the positioning of plate 58 at any of the plurality of positions in the assembly so that group of equally sized apertures 62 through 68 can be positioned in communication between bores 48 and the interior of housing 30. One simple means for effecting the varied positioning of plate 58 comprises a series of apertures 70 placed at each end of the plate 58. These apertures are positioned for cooperative engagement by machine bolts 72 which are adapted for insertion through bore 74 of cover plate 42 and engagement in bores 76 that are provided with engaging female threads. Plate 58 has a width which permits it to clear the peripheral row of assembly bolts 44 and, accordingly, bolts 72 can be readily loosened to permit sliding of plate 58 between its varied positions in the assembly.

To insure that the assembly will be fluid tight, various sealing or gasket means can be provided such as gaskets 78 and 80 that are sandwiched between cover plate 42 and peripheral flange 38 of housing 30. Any suitable material can be used for such gasket means, e.g., rubber, Teflon, polyolefins, etc.

In operation, the plate 58 is placed in either of its varied positions so as to orient a group of its apertures, e.g., the group of the smallest apertures 62 directly beneath bores 48 of plate 42. In this setting, the applicator pump 26 is adjusted for its low flow rate, e.g., for discharge at 15 gallons per acre. The small apertures 62 will insure adequate pressure drop through the system and even flow distribution. When the higher application rates are desired, plate 58 is moved to a new position exposing a group of intermediate or largest apertures, e.g., apertures 68, and the pump of the applicator is adjusted to discharge flow at the high rate, e.g., at 150 gallons per acre. The entire device has no moving parts during operation and is essentially maintenance free. The device can be made of various materials with suitable corrosion resistance, stainless steel being preferred, so as to permit use of the applicator with materials such as highly corrosive fertilizer solutions.

Figure 3:
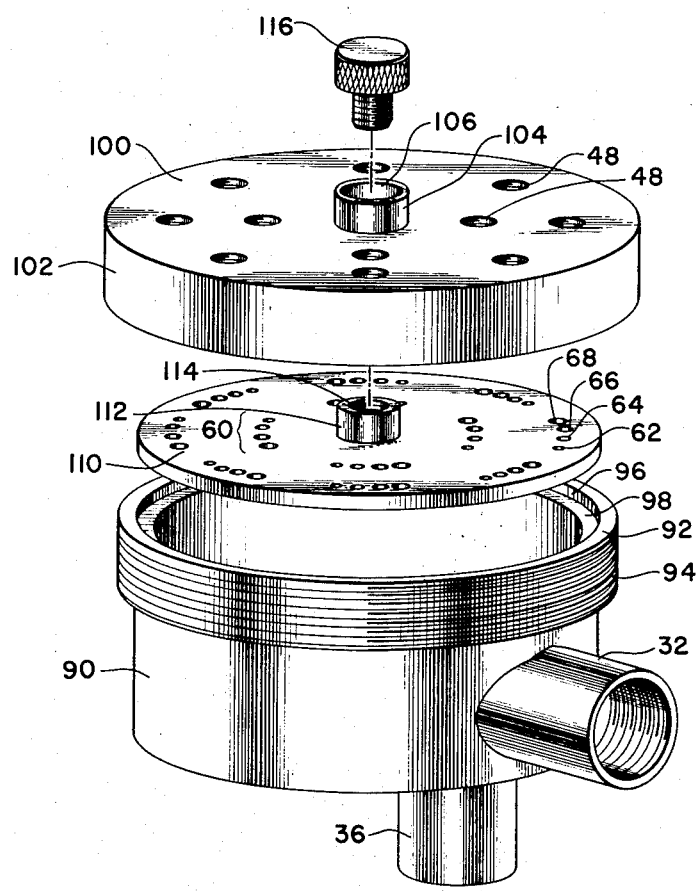
FIG. 3 is a view of an alternative flow distributor according to this invention.

FIG. 3 shows an alternative design for the distributor device. In this design, the housing 90 is circular and is provided with flow passageway and connecting means 32 as previously described. The top of the housing has a peripheral annular flange 92 which is threaded with male threads at 94. The upper surface of this flange is counterbored at 96 to provide an annular shoulder 98. The housing 90 is covered with a plate 100 which has a skirt 102 that is provided with female threads to engage threads 94 of peripheral flange 92. Disposed in two circular rows are a plurality of threaded bores 48 which are similar to those previously described with regard to FIG. 2. The center of plate 100 also has a boss 104 which is bored at 106. Associated with cover plate 100 is circular plate 110 which has a diameter to permit it to be seated in the assembly in counterbore 96, resting on shoulder 98. The plate 110 is provided with a plurality of sets 60 of apertures 62, 64, 66 and 68 which are similar to those previously described with regard to FIG. 2. These apertures are disposed in circular arrays so as to be positioned beneath tapped bores 48 of cover plate 100 in the assembly. Plate 110 also has a center boss 112 extending upwardly and adapted to project through bore 106 of cover plate 100. This central boss 112 is provided with a tapped bore 114 and a thumb screw 116 having a threaded shank for engagement in tap bore 114 is provided to permit adjustable rotation of plate 110 in the assembly.

Although not shown, various and conventional sealing means are employed. For example, boss 112 can be grooved and a suitable O-ring or plurality of O-rings can be used to prevent fluid leakage between the boss and bore 106. Similarly, the assembly can be provided with a gasket ring between shoulder 98 plate 110 and a similar ring between the upper surface of plate 110 and the under surface of cover plate 100.

Regardless of the particular shape used for the distributor device, it will be found that an efficient and maintenance free flow distributor can be provided which will function for use with liquid solutions or with slurries or suspensions of materials to effect even distribution of liquid from a central source to a plurality of conduit means under a widely varied flow condition.

The invention has been described with particular reference to the illustrated and preferred mode of practice thereof. It is not intended that the invention be unduly limited by such disclosure. Instead, it is intended that the invention be defined by the elements and their obvious equivalents set forth in the following claims.

I claim:

1. In a liquid fertilizer applicator adapted to be used for distribution of liquid fertilizer in a field and comprising a storage vessel for liquid, a transverse boom extending laterally on said applicator, a plurality of liquid discharge means regularly and evenly spaced on said transverse boom, distribution means connecting the said storage vessel to each of the said liquid discharge means, said distribution means including as the improvement thereof a flow distributing device which comprises a housing, connection means associated with said inlet port for attachment thereto of a conduit, at least one wall of said housing being provided with a plurality of apertures disposed in a regular pattern therein, connection means for attachment of conduits to each of said apertures, a plate for use in association with said wall of said housing which is movable between a plurality of positions in said housing and which is provided with a plurality of sets of apertures of regularly varied cross-sectional area, each of said sets being disposed in said plate with the same pattern as the pattern of said apertures in said wall of said housing and adapted to be positioned in fluid transferring orientation between the interior of said housing and said apertures in said wall thereof with apertures of equal cross-sectional area of said flange being associated with each of said apertures in said wall of said housing, and means for fixed adjustability of the position of said plate.

2. The applicator of claim 1 wherein said fluid distributing device has a generally rectangularly shaped housing and said plate is slidably movable between said plurality of positions.

3. The applicator of claim 1 wherein said housing also contains a port in its lower wall for draining the contents from said housing.

4. The fertilizer applicator of claim 1 wherein said housing is generally circular and said plurality of apertures are disposed in a circular pattern with said plates being rotatably movable between said plurality of positions.

5. The applicator of claim 1 including pump means in the flow distribution system and adapted to withdraw liquid from said storage vessel and supply said liquid to said flow distributing device.

6. The device of claim 1 wherein each of said multiple conduit connecting means is connected to a conduit which extends to each of a plurality of liquid discharge means which are regularly and evenly spaced on a transverse boom.

7. The device of claim 6 wherein said injection means comprises shanks that are resiliently carried by said boom and adapted for being dragged beneath the surface of the ground and associated therewith a discharge conduit in fluid communication with said multiple conduits.

* * * * *